ELECTRICAL CONNECTOR

Filed July 5, 1963

INVENTOR.
GEZA P. BOTTLIK
BY
Christie, Parker & Hale
ATTORNEYS.

Oct. 11, 1966 G. P. BOTTLIK 3,278,884

ELECTRICAL CONNECTOR

Filed July 5, 1963

3 Sheets-Sheet 2

INVENTOR.
GEZA P. BOTTLIK
BY
Christie, Parker & Hale
ATTORNEYS.

United States Patent Office 3,278,884
Patented Oct. 11, 1966

3,278,884

ELECTRICAL CONNECTOR

Geza P. Bottlik, South Pasadena, Calif., assignor to Burroughs Corporation, Detroit, Mich., a corporation of Michigan Filed July 5, 1963, Ser. No. 292,857
10 Claims. (Cl. 339—17)

This invention relates to the interconnection of conductors in micromodule packaging and it is particularly useful in the interconnection of closely spaced conductors attached to thin circuit boards.

Numerous pieces of electronic apparatus are presently being built up by using very thin circuit boards and micromodule components. With the advent of the missile age, it has become increasingly important that this electronic apparatus occupy the smallest space possible. This is due to the space and weight limitations placed on all apparatus located in a missile.

Another reason for making the electronic apparatus as small as possible is for shortened electrical paths with a resultant increase in speed of operation. This is especially true in the computer art wherein it is desired to attain the fastest operation possible. A typical example in the computer art, wherein the closeness of the circuitry is important in the reduction of electrical path length and time of operation, is in the memory portion of the computer. Thin-film memories are particularly suited for shortened path lengths to increase the speed of operation and are usually stacked one on top of another to form the memory system. However, the stacking of the circuit boards presents the problem of how to make electrical connection between the circuits.

The problem of interconnection becomes particularly acute where the conductors are very small and are closely spaced. For example, a thin-film memory, which is presently employed in the computer art, comprises a rectangular circuit board 0.025 inch thick. On this circuit board, there are as many as 20 conductors per inch terminating at each edge on both the top and bottom surfaces thereof. When a plurality of these circuit boards are stacked to form the memory system of a computer, it becomes very difficult to make the proper interconnections.

When the conductors are very small and are placed close together, one of the ways to make the interconnections is to employ individual wires. However, once the wires are soldered or otherwise connected to the conductors of the circuit boards, it becomes very difficult to remove any one of the boards for maintenance or replacement. Also there is the problem of placement of the wires to present the least interference and confusion.

Additionally, in some applications the conductors attached to the surfaces of the circuit board are paired to form transmission lines. For example, a conductor on the top surface, which is directly above and parallel to a conductor on the bottom surface of the circuit board, may be paired with the bottom conductor to form a strip transmission line. Thereafter, any connection to the circuit board should retain the transmission-line effect. The obvious way to make connections between paired transmission lines is to use coaxial cables. However, because of the smallness of the conductors and their close proximity, coaxial cables are not practical.

Therefore, in accordance with the present invention, the conductors on one surface of a circuit board, which terminate at one edge thereof, are connected to an external circuit through an effective coupling means. The coupling means comprises thin laminated tabs which have a thickness approximately equal to the space between the conductors. At least one outside layer of each tab is capable of conducting electrical energy and is supported by an inside layer of non-conductive material. The conductive material of each tab is soldered or otherwise connected to the conductors of the circuit board. The ends of the tab remote from the point of connection to the conductors of the circuit board are tapered to make interconnection less difficult. When all of the conductors terminating at one edge of the circuit board have tabs attached thereto, the resultant structure is an electrical plug, which may be effectively employed to connect the circuit boards to external circuits.

The resultant electrical plug is particularly advantageous when the circuit board has conductors on both the top and bottom surface. Tabs are then connected to the conductors on both surfaces and extend from the circuit board in the same direction to form an electrical plug having two rows of tabs or prongs.

A plurality of circuit boards may be effectively interconnected by employing the tabs and inserting them into a receptacle designed for this purpose. The receptacle comprises a frame for supporting strips of conductive material, which are spaced according to the thickness of the tabs to be inserted. The strips of conductive material are attached to layers of insulating material to form a lamination. The layer of conductive material is of sufficient length to interconnect the tabs of one circuit board and the selected tabs of another circuit board, when the plugs are inserted into the receptacle.

The conductive and insulating strips of the receptacle are loosely attached to the frame of the receptacle so that there is sufficient clearance to permit the electrical plug formed by the tabs to be inserted into the receptacle. After the tabs have been inserted into the receptacle, the conductors of the receptacle are compressed to produce a more positive connection. For each row of tabs inserted into the receptacle, there is provided a means in line with the row of tabs to compress the conductors of the receptacle and the conductors of the tabs.

These and other features and advantages of the present invention will be understood more clearly and fully upon consideration of the following specification and drawing in which:

FIG. 7 is a pictorial diagram of a portion of the electrical plug and a portion of a receptacle for electrical plugs, in accordance with the invention;

Figure 1:
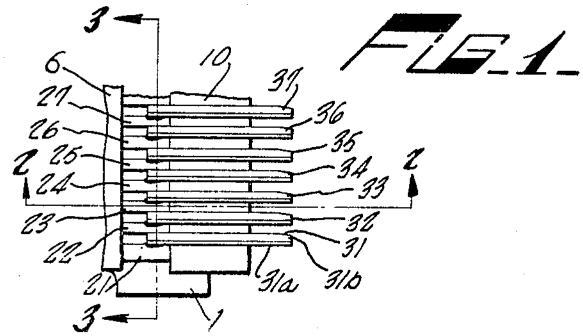
FIG. 1 is a top plan view of an electrical plug, in accordance with the invention.

Now referring to the drawings, in FIG. 1 there is shown a plan view of a circuit board 1 having a plurality of conductors of which conductors 21 through 27 positioned thereon are representative. The conductors are closely spaced and terminate in a common line at the edge of the circuit board 1. In actual practice, the conductors may be considerably smaller than is represented in the drawing and may also be more closed spaced. However, for purposes of illustration, it will be assumed that the conductors have the size and spacing shown in FIG. 1.

A plurality of tabs 31 through 37 are positioned between each conductor to provide an effective coupling means between the conductors of the circuit board and an external circuit. The tabs are laminated and, as shown by tab 31, have at least one layer of a conductive material 31*a* and a layer of insulating material 31*b*. The tabs are supported by a slotted piece of insulating material 10, which is positioned so that it overlaps a portion of the conductors. The tabs are placed in the slotted piece 10 and the conductive material of the each tab is associated with and makes contact with one of the conductors and is in some way electrically connected to that conductor. The connection of these tabs to the conductors may be more easily seen in FIG. 2 which is a sectional view taken along the section lines 2—2 of FIG. 1.

Figure 2:
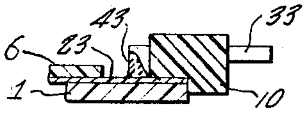
FIG. 2 is a cross-sectional view, taken along the line 2—2, of the electrical plug of FIG. 1, in accordance with the invention.
Figure 3:
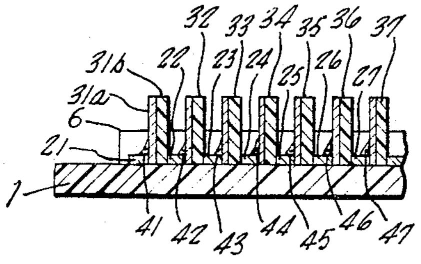
FIG. 3 is a cross-sectional view, taken along the line 3—3, of FIG. 1.

The sectional view in FIG. 2 shows the connection of the tab 33 with the conductor 23 of circuit board 1. In contact with conductor 23 is the conductive material of tab 33. The conductive material of tab 33 is electrically and mechanically joined to the conductor 23 by a solder joint 43, as illustrated. Also shown in FIG. 2 is the piece of insulating material 10, which is slotted to support the tabs. The connection and the relative position of the tabs and the conductors may be seen more clearly in FIG. 3 which is a cross-sectional view taken along line 3—3 of FIG. 1. Each tab 31 through 37 is connected to the conductors 21 through 27 of the circuit board 1 by solder connections 41 through 47.

The electrical connector that results from the connection of the tabs to the conductors on the circuit board may be now understood more easily by again referring to FIG. 1. It is seen that the tabs extend away from the conductors of the circuit board to effectively form an electrical plug. The ends of the tabs that are remote from the connection to the conductors are tapered so that the plug will be more easily insertable into a receptacle.

Figure 4:
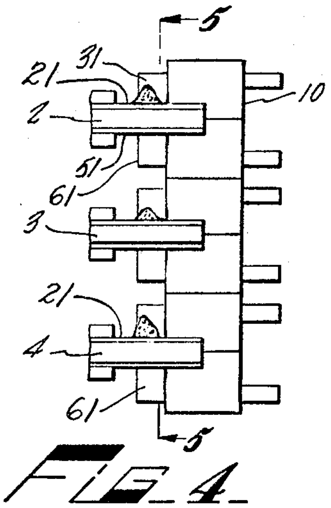
FIG. 4 is a side elevational view of an electrical plug for a plurality of circuit boards with conductors on both sides, in accordance with the invention.

When the circuit board has conductors attached to both surfaces, the tabs will be connected to both the top and bottom of the circuit board. Thus, two rows of tabs will result as shown in FIG. 4. Additionally, in FIG. 4, there are shown circuit boards 2, 3 and 4 which are stacked one on top of the other. When circuit boards are stacked, the insulating and supporting piece 10 for each row of tabs may have slots of sufficient depth to permit an extension of insulating material above the row of tabs for insulation and separation from an adjacent row of tabs.

Each circuit board 2, 3 and 4 may be a thin-film memory plane of the type developed for computers or it may be some other circuit in some other art. In any event, the application may require that the individual conductors of each circuit board be connected in parallel with selected conductors of adjacent circuit boards. For example, in the computer art all of the conductors terminating at one particular edge of a thin film memory must be connected in parallel to a control circuit for proper operation. Thus, for illustrative purposes, it is assumed that the conductors of the circuit boards 2, 3 and 4 of FIG. 4, which terminate at the edge shown, are to be connected in parallel.

Figure 5:
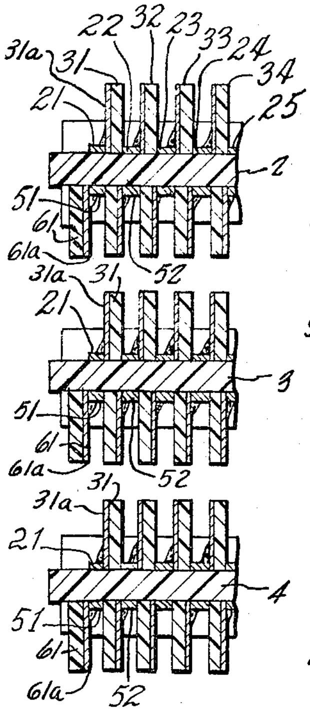
FIG. 5 is a cross-sectional view, taken along the line 5—5, of the electrical plug of FIG. 4.

A cross-sectional view taken along line 5—5 of FIG. 4 of the connector or electrical plug formed, when the tabs are attached to the circuit boards 2, 3 and 4, is shown in FIG. 5. The conductors on each circuit board may be very thin and placed very close together. However, for purposes of illustration, the conductors and tabs are enlarged in FIG. 5 to see more easily the positioning of the tabs and conductors.

The top conductors 21 of each circuit board 2, 3 and 4 lie in a common plane, i.e., one above the other. Thus, a tab 31, which is connected to each conductor 21 of the three circuit boards, will also lie in a common plane with the layer of conductive material 31*a* on the same side of each tab and in a common plane.

It is seen in FIG. 4 that the tabs protrude beyond the circuit boards and the insulating and supporting piece 10. Therefore, a conductor 71*b* extending from the tab 31 associated with the top conductor 21 of circuit board 2 to tab 31 associated with the top conductor 21 of circuit board 4 will connect conductors 21 in parallel. This is more clearly illustrated in FIGS. 6 and 10.

Figure 6:
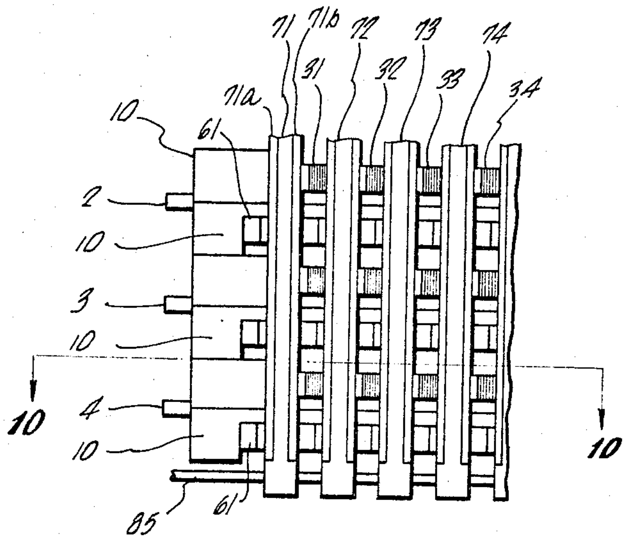
FIG. 6 is a pictorial diagram of a portion of a plug and a portion of a receptacle for the electrical plug of FIG. 4, in accordance with the invention.
Figure 10:
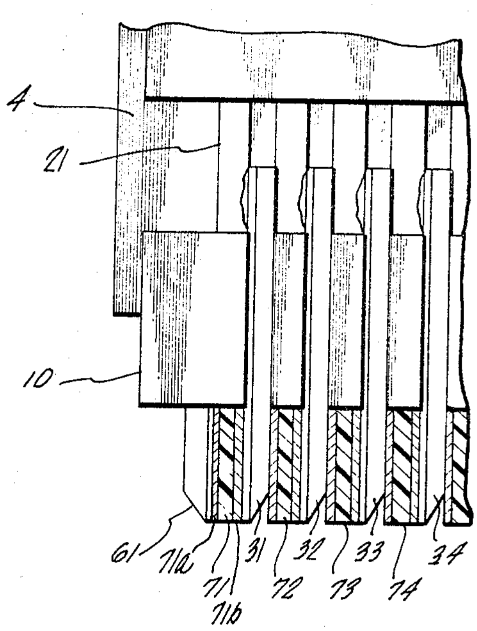
FIG. 10 is a view partially in cross-section taken along the line 10—10 of the plug and receptacle of FIG. 6.

Similarly the tabs 61, which are attached to the bottom conductors 51 of the circuit boards 2, 3 and 4, have a layer of conductive material 61*a* lying in a common plane as seen in FIG. 5. Thus, conductors 51 can be connected in parallel through tabs 61 by a layer of conductive material 71*a* adjacent to this common plane. This configuration is also more clearly seen by reference to FIGS. 6 and 10. In FIGS. 5, 6 and 10, it is seen that a layer of conductive material 71*b* adjacent to the plane of the conducting material 31*a* on tabs 31 will connect conductors 21 in parallel, and a layer of conductive material 71*a* adjacent to the common plane of the conductive material 61*a* on tabs 61 will connect conductors 51 in parallel.

Common strips of insulating material 71 through 74 with two layers of conductive material attached are shown in FIGURES 6, 7, and 10. A first layer of conductive material 71*a* is in contact with the conductive layer on tabs 61 to connect conductors 51 on the bottom of circuit boards 2, 3 and 4 in parallel and a second layer of conducting material 71*b* is in contact with the conductive layer on tabs 31 to connect conductors 21 attached to the top of circuit boards 2, 3 and 4 in parallel. The tabs in FIG. 6, of which tabs 31 and 61 are respective, are enlarged in size to show more clearly the interrelationship of the tabs when inserted in a receptacle for parallel connections.

The pictorial diagram of FIG. 6 shows a portion of the receptacle, including strip 71, for connecting the conductors in parallel. It is assumed that the receptacle is viewed in FIG. 6 from the back side. Thus, the tabs are inserted into the receptacle from the other side or from behind the plane of the paper. The layers of conducting material 71*a* and 71*b* are of sufficient length to connect the conducting material of each tab 31 in parallel on one side and the conducting material of each tab 61 in parallel on the opposite side. All other conductors lying in a common plane are similarly interconnected by other strips of circuit board in the receptacle.

The construction of the interconnecting strips and their position for interconnecting the conductive layers of the tabs are shown in FIG. 10, which is a view taken along the line 10—10 in FIG. 6. In FIG. 10, it is seen that the tabs attached to the conductors on top of the circuit board 4, of which tabs 31–34 are representative, extend beyond the insulating block 10, in which the tabs are positioned and held. The tabs associated with the conductors on the bottom of the circuit board 4 similarly extend beyond the insulating block 10. Tab 61 is representative of these tabs.

Positioned between the tabs in the area beyond the edge of the insulating block 10 are the interconnecting strips, shown in cross-section, of which strips 71–74 are representative.

A pair of adjacent conductors on a circuit board, for example, conductors 21 and 51 of circuit board 2 in FIG. 5, may be paired to form a strip transmission line. Normally this strip transmission line is to be connected in parallel to the strip transmission lines of the other circuit boards. An effective means of interconnecting the strip transmission lines is through a receptacle, like the one shown in FIG. 6. Each strip of circuit board of the receptacle has a layer of conductive material on each side of a thin layer of insulating material and in contact with one of the conductors which form the transmission line. Thus, the transmission line effect is continued through the coupling means. The strip transmission line is then continuous through the interconnection. The strip transmission lines of the circuit boards are coupled to the strip transmission lines of the receptacle, which lie in perpendicular planes, through the associated tabs.

The construction of the receptacle and the insertion of the electrical plugs resulting from the connection of the tabs to the circuit boards are seen more clearly in FIG. 7. The circuit boards of the receptacle, which are representatively depicted by circuit board 71, are attached to a frame 80. The top of each circuit board of the receptacle is attached by a pin 84 which extends through all of the circuit boards. The bottom of each board is similarly attached and secured by a pin 85, which also extends through all of the boards.

The circuit boards of the receptacle have sufficient lateral movement to permit the electrical plugs to be inserted without damage to any of the elements. Once a plug is inserted, a means is employed to compress the circuit boards and tabs to make more positive contact. In the receptacle of FIG. 7, each row of tabs has an associated screw to adjust the contact pressure. For example, the tabs of circuit board 2 are compressed between the circuit boards of the receptacle by the adjustment of screws 86 and 87. In the computer art, the resultant receptacle forms an effective pluggable backplane which is employed to interconnect stacked circuit boards.

Figure 8:
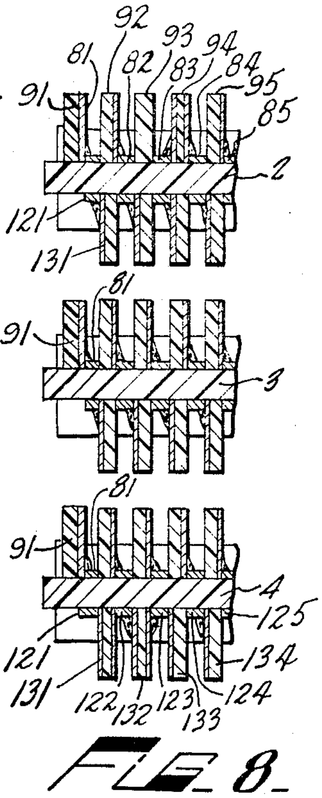
FIG. 8 is a cross-sectional view of a portion of circuit boards similar to those of FIG. 4 showing the tab arrangement for connecting the circuit boards in series.

When the conductors of the circuit boards are to be connected in a manner other than in parallel, a different receptacle will have to be employed. Now referring to FIG. 8 for purposes of illustration, it is assumed that the conductors terminating at the edge of the stacked circuit boards 2, 3 and 4 are to be connected in series. Conductor 81 of circuit board 2 is to be connected to an input signal. Conductors 81 of circuit boards 3 and 4 are to be connected together at the end shown to effect a series connection. Thus, tabs 91 are connected to each conductor 81 of the circuit boards and protrude beyond the edge of the boards for insertion into a receptacle.

Figures 1, 9:
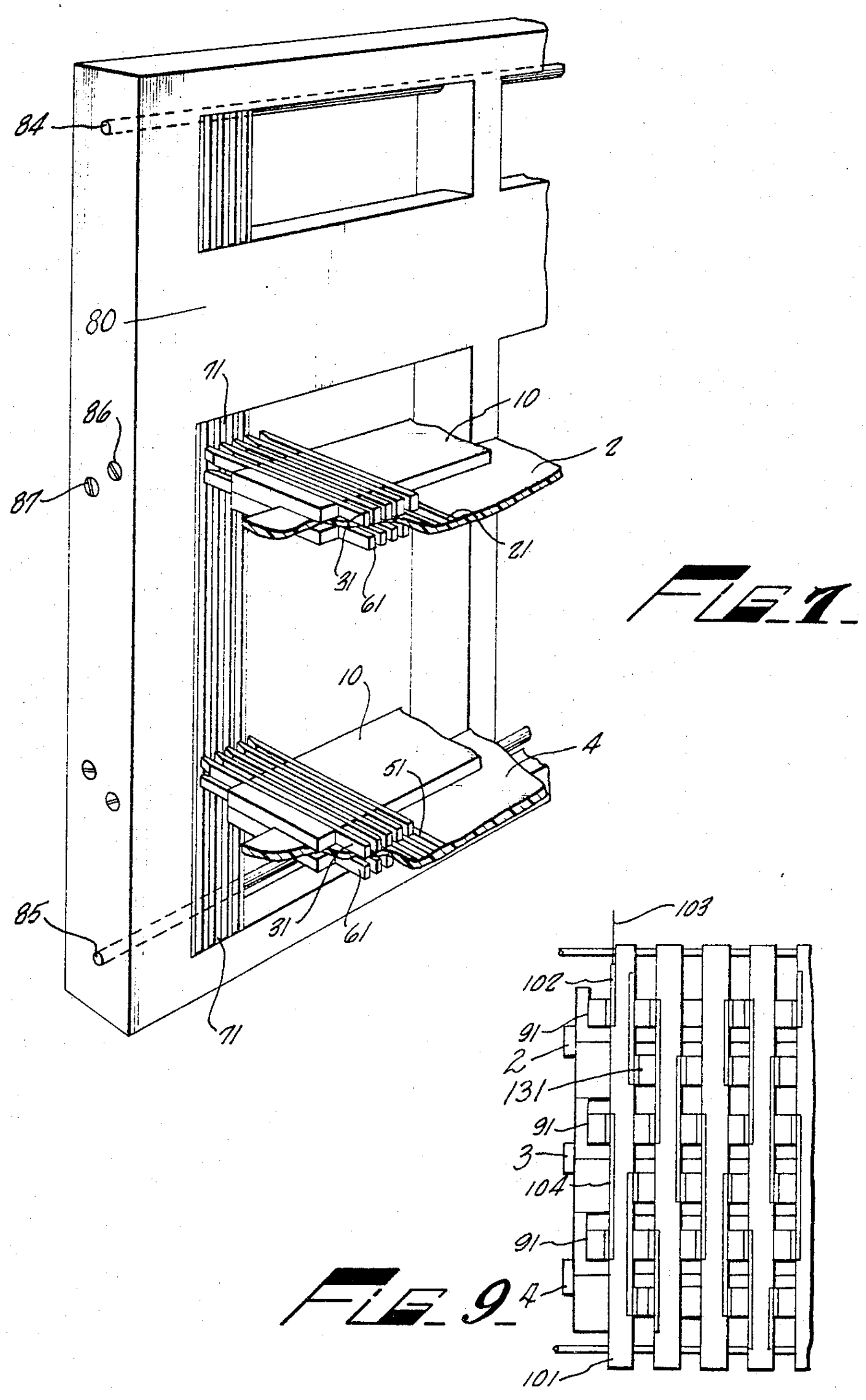
FIG. 9 is a portion of a plug and a portion of a receptacle for connecting the circuit boards of FIG. 8 in series.

The circuit board 101 of the receptacle which provides the conduction path between the input signal and circuit board 2 and the conduction path between conductors 81 of circuit boards 3 and 4 is shown in FIG. 9. A short length of conductive material 102 connects tab 91 to an input lead 103. Additionally, a short length of conductive material 104 connects tabs 91, which are associated with circuit boards 3 and 4 to effect a series connection of conductors 81 thereof. The other circuit boards of the receptacle will be similarly constructed to complete the series connection.

What is claimed is:

1. A circuit board connector comprising a circuit board having a plurality of parallel conductors attached to one surface and terminating along a common edge, laminated tabs resting between the parallel conductors on the surface of the circuit board to which the conductors are attached and extending beyond the common edge of said circuit board to form prongs, each tab having at least one outside layer of conductive material in electrical contact with the conductor adjacent the tab on the side of the conductive layer, the principal plane of the layer of conductive material and each tab being perpendicular to the principal plane of said circuit board, and means for electrically and mechanically connecting the layer of conductive material of each tab to the adjacent conductor.

2. A circuit board connector in accordance with claim 1 wherein the tabs are tapered at the end remote from the end attached to the conductors to make the resultant plugs readily insertable into a receptacle.

3. In combination, a plurality of circuit boards having a number of parallel conductors attached to one surface and terminating along a common edge, means for supporting said circuit boards in parallel planes at a selected distance one from the other in a stacked configuration and with the common edge of each circuit board lying in a common plane, laminated tabs resting between the parallel conductors on the surface of each circuit board to which the conductors are attached and extending beyond the common edge of said circuit board to form prongs, each tab having at least one outside layer of conductive material in electrical contact with the conductor adjacent the tab on the side of the conductive layer, the principal plane of the layer of conductive material and of each tab being perpendicular to the principal plane of said circuit board, and means for electrically and mechanically connecting the layer of conductive material of each tab to the adjacent conductor.

4. In combination, a plurality of circuit boards having numerous parallel conductors attached to one surface and terminating along a common edge, the conductors of each circuit board that are to be connected to a conductor of another circuit board being positioned in a common plane, means for supporting the circuit boards in parallel planes at a selected distance one from the other in a stacked configuration and with the common edge of each circuit board lying in a common plane, laminated tabs resting between the parallel conductors on the surface of each circuit board to which the conductors are attached and extending beyond the common edge of said circuit board to form prongs, each tab having at least one layer of conductive material in electrical contact with the conductor adjacent the tab on the side of the conductive layer, the principal plane of the layer of conductive material and of each tab being perpendicular to the principal plane of its associated circuit board, means for electrically and mechanically connecting the layer of conductive material of each tab to the adjacent conductor, and a plurality of connector boards extending between the tabs of the conductors to be interconnected, each connector board having a layer of conductive material in electrical contact with the layer of conductive material of the associated tabs.

5. A connector for circuit boards comprising a circuit board with a plurality of parallel conductors terminating at one edge, a piece of insulating material extending back from the one edge over a portion of all of the conductors, a plurality of parallel slots cut into the insulating material, the plurality of slots being equal in number to the conductors of the circuit board, and laminated strips having a layer of conductive material and a layer of insulating material inserted in each slot, the conductive material of each strip making electrical contact with one of the conductors of the circuit board and extending away from the one edge of the circuit board to form prongs.

6. A connector in accordance with claim 5 wherein the parallel slots in the piece of insulating material are of sufficient depth to permit the insulating material to extend above the inserted laminated strips.

7. In combination, a circuit board having conductors terminating at one edge on both the top and bottom surface thereof, a plurality of laminated tabs having a layer of conductive material on a layer of nonconductive material, each layer of conductive material lying in a plane perpendicular to the plane of the circuit board, a first row of tabs connected to the conductors on the top surface, and a second row of tabs connected to the conductors on the bottom surface, all of the tabs extending in the same direction away from the one edge to form an electrical plug having a plurality of prongs in the form of two rows of tabs.

8. In combination, a plurality of circuit boards lying in parallel planes having conductors terminating at one edge on both the top and bottom surfaces, the one edge of each circuit board being contiguous to a common plane, a first row of laminated tabs conductively attached to the conductors on the top surface of each circuit board, a second row of laminated tabs conductively attached to the conductors of the bottom surface of each circuit board, each tab of both rows having a principal plane perpendicular to the plane of the circuit board, and a piece of insulating material supporting each row of tabs and extending above its associated row of tabs, the circuit boards being stacked so that the pieces of insulating material maintain a fixed distance between adjacent circuit boards.

9. An electrical connector comprising a circuit board having a plurality of conductors lying in a common plane on the circuit board and being parallel near and terminating at a common edge of the board, tabs having at least one layer of conductive material and a layer of insulative material, each tab having a principal plane perpendicular to the common plane of the conductors, the layer of conductive material of each tab making electrical contact with one of the conductors, means for electrically and physically connecting the layer of conductive material to the contacted conductor, a plurality of laminae lying in parallel planes, at least one outside surface of each lamina being of conductive material, the ends of each lamina being attached to a rigid frame, the lamina having sufficient spacing to accommodate the tabs, and means for reducing the distance between the lamina and the tabs to make positive contact between the layer of conductive material and the tabs after the tabs are inserted between the lamina.

10. A connector for interconnecting circuit boards having conductors terminating at a common edge and forming strip transmission lines comprising a plurality of circuit boards, each circuit having a plurailty of conductors attached to both the top and bottom surfaces and lying in two common planes on the circuit board and being parallel near and terminating at a common edge of the circuit board, the conductors on the top and bottom surfaces of each circuit board being paired to form a strip transmission line, means for forming strip transmission lines to interconnect the individual transmission lines of one circuit board to the individual transmission lines of another circuit board, said forming means including laminated tabs having a layer of conductive material and a layer of insulative material, each tab being positioned between the conductors on the connector board and associated with one of the conductors of the connector board, each layer of insulative material of said tab having a thickness substantially equal to the thickness of the circuit board separating the conductors on the top and bottom surfaces thereof, each layer of conductive material of said tabs having a principal plane perpendicular to the plane of the circuit board, means for electrically connecting the layer of conductive material of each tab to its associated conductor on the circuit board, and a plurality of laminated connector boards lying in parallel planes, the outside surfaces of each connector board being of conductive material, the ends of each connector board being attached to a rigid frame with sufficient spacing therebetween to accommodate the tabs attached to the circuit boards.

References Cited by the Examiner

UNITED STATES PATENTS

| | | | |
|---|---|---|---|
| 1,984,036 | 12/1934 | Schwartzmann | 339—198 X |
| 2,747,167 | 5/1956 | Parrish | 339—176 |
| 2,748,364 | 5/1956 | Kamm | 339—17 |
| 2,799,837 | 7/1957 | Powell | 339—17 |
| 2,876,402 | 3/1959 | Billings | 339—17 X |
| 2,926,340 | 2/1960 | Blain et al. | 339—17 X |
| 2,971,179 | 2/1961 | Heuer | 339—17 |
| 3,208,026 | 9/1965 | Ruehlemann | 339—17 |

FOREIGN PATENTS

| | | |
|---|---|---|
| 913,092 | 12/1962 | Great Britain. |

EDWARD C. ALLEN, *Primary Examiner.*

ALFRED S. TRASK, BOBBY R. GAY, *Examiners.*